United States Patent [19]

Shaw

[11] 4,400,440

[45] Aug. 23, 1983

[54] ELECTROSTATIC PAPER BASE AND METHOD OF MAKING THE SAME

[75] Inventor: Michael J. Shaw, Paw Paw, Mich.

[73] Assignee: Allied Paper Incorporated, Kalamazoo, Mich.

[21] Appl. No.: 222,014

[22] Filed: Jan. 2, 1981

[51] Int. Cl.$^3$ ........................ B32B 23/08; B32B 27/10; B05D 3/02; B05D 3/10

[52] U.S. Cl. .................................... 428/511; 427/209; 427/341; 427/342; 427/391; 427/401; 430/18; 430/49; 430/64; 430/69

[58] Field of Search ............... 427/209, 211, 382, 391, 427/411, 401, 341, 342; 428/511; 430/49, 69, 64, 18

[56] References Cited

U.S. PATENT DOCUMENTS

| | | | |
|---|---|---|---|
| 2,758,102 | 8/1956 | Grummitt et al. | 260/29.6 |
| 2,842,451 | 7/1958 | Grummitt et al. | 106/194 |
| 3,298,831 | 1/1967 | Lau et al. | 96/1.5 |
| 3,389,109 | 6/1968 | Harmon et al. | 260/29.6 |
| 3,607,255 | 9/1971 | Back | 96/1.5 |
| 3,653,894 | 4/1972 | Levy et al. | 96/1.7 |
| 3,753,965 | 8/1973 | Looney et al. | 260/88.1 |
| 3,787,235 | 1/1974 | Honjo et al. | 117/218 |
| 3,799,901 | 3/1974 | McCann et al. | 260/29.6 |
| 3,839,033 | 10/1974 | Matsuno et al. | 96/1.5 |
| 4,293,595 | 10/1981 | Kreiling et al. | 430/69 X |
| 4,293,629 | 10/1981 | Shaw et al. | 430/64 |

FOREIGN PATENT DOCUMENTS

| | | |
|---|---|---|
| 1029055 | 5/1962 | United Kingdom . |
| 1024882 | 9/1962 | United Kingdom . |
| 1024883 | 9/1962 | United Kingdom . |

*Primary Examiner*—Michael R. Lusignan

*Attorney, Agent, or Firm*—Richard H. Thomas

[57] ABSTRACT

There is provided a method of coating a paper substrate in either sheet or web form to form a base useful in forming electrostatic masters. A thin coating of a reactive film forming resin is applied to the paper and the resin reacted with an ammonium zirconyl complex and dried. This treatment avoids blocking or sticking together of successive layers of paper coated with relatively low glass transition temperature film forming resins.

16 Claims, No Drawings

ELECTROSTATIC PAPER BASE AND METHOD OF MAKING THE SAME

The present invention relates to a coated paper which is particularly useful for electrophotographic sensitive papers, and more particularly to the manufacture of base paper suitable for electrostatic masters for lithographic printing.

BACKGROUND OF THE INVENTION AND PRIOR ART

The present invention relates as indicated, to the preparation of a coated paper substrate which is particularly useful as a base for electrostatic or electrophotographic sensitive papers, and more particularly to the preparation of base paper having a water and solvent barrier coating thereon and useful in making a lithographic printing plate or offset master for use in electrostatic procedures.

In lithographic printing, a plate is prepared characterized by image areas which are compatible with an oil base ink and hence oleophilic or hydrophobic, and non-image areas which are oleophobic or hydrophilic. This plate when mounted on a printing press is first wet by a roll carrying a fountain solution which is an aqueous base composition whereby the hydrophilic areas become wet and not receptive to ink, and the oleophilic areas are left uncoated. Thereafter, the plate carrying roll is contacted by the inking roll whereby the nonwetted image areas are coated with an oil base printing ink and the nonimage areas, which repel ink, are left uncoated. In offset printing, the plate roll then comes into pressure contact with a blanket roll to which the ink is transferred in conformity with the image pattern on the plate. The blanket roll is then run in contact with a pressure roll, and a paper web or sheet is introduced between the pressure roll and the blanket roll. The ink from the blanket roll is then transferred to the paper to provide a printed image or final print.

A number of methods has been suggested for preparing an image on a plate to be used in lithographic printing. While direct typing on the plate with a special ink has been used, several procedures have been developed using electrostatic printing principles. According to one of these procedures a plate or sheet including a photoconductive layer extending over its image receiving side is first given a uniform charge over the entire surface in the dark. Then, an image-defining electrostatic charge is formed by exposure of charged photoconductive layer to light through a positive image. The charge is removed in those areas receiving light, and remains where shadow has fallen. This is similar to a photographic process and hence the process is referred to as electrophotographic imaging. Another type of electrostatic process resembles electrographic printing. In this case, an image defining electrostatic charge is laid directly down upon an insulating or dielectric film in a plate. For this purpose, a cathode ray tube, a pin matrix, or a pulsing carona discharge may be used. Alternatively, a direct image transfer may be made from one surface to another. With either of such electrostatic imaging procedures, after the image defining charge has been imposed on the sheet, the image may be developed using a finely divided developer material or toner which deposits on the sheet in those areas where the charge appears. The toner is oleophilic, i.e., readily accepts ink from an inking roll. The sheet or plate with the image developed thereon may be employed as the offset master in a lithographic printing process as described above providing the sheet, either after development, or after further processing, has the proper differentiation between the oleophilic or ink receptive areas (image areas) and the hydrophilic areas or nonimage areas. The latter are receptive to an aqueous medium, such as a fountain solution, but not to ink.

Various types of electrostatic papers and the methods for producing them are well known. For example, reference may be had to U.S. Pat. No. 3,607,255 wherein an offset master is produced using electrostatic imaging procedures. According to this procedure a dielectric film which provides the surface on the plate includes finely divided silica dispersed therein. This yields a very fine roughening on the outer surface of the dielectric film. After the development of the image, a hydrophilic desensitizing composition is spread over the nonimaging areas. The desensitizing composition remains distributed over the nonimage areas during the process of making electrographic prints which involves repeated wetting of the nonimage areas with an aqueous fountain solution followed by application of ink to the image areas.

U.S. Pat. No. 3,787,235 discloses a method of making an electrophotographic sensitive paper.

U.S. Pat. No. 3,653,894 discloses a method of making an electroconductive paper for electrographic recording.

The present invention is concerned with a paper base for such various electrostatic papers and a method of making it.

As indicated above, in actual use, the fountain solution and ink are applied to the master once for each imprint on the paper sheet or web. With masters run for a long time, e.g., more than 1000 copies, it is necessary to protect the paper base (which preferably is a wet strength paper) against the action of the aqueous fountain solution. This protection is usually achieved by providing the paper base with one or more water resistant layers which can be referred to as barrier coatings located between the base and the photoconductive layer. Absorption of the fountain solution into the paper base has several undesirable effects. Primarily, it causes dimensional instability of the fiber in the paper in turn causing distortion of the paper and the image. This results in imperfect registration and wrinkling of the plate. Attack by water on the zinc oxide or photoconductive layer bond as well as on the various subcoatings reduces the strength of these bonds. Eventually, picking off of portions of the zinc oxide coating and/or subcoatings from the master onto the printing blanket causes the loss of image continunity, and/or background fill-in.

Conventional barrier coatings used in the construction of lithographic paper masters are described in U.S. Pat. Nos. 3,298,831 issued to Lau; 3,653,894 issued to Levy; 3,839,033 issued to Matsuno; and 3,787,235 issued to Honjoe. The use of natural and synthetic adhesives to provide surface strength and water resistance to lithographic masters is summarized in TAPPI Monographs 36 and 37, by the Technical Association of the Pulp and Paper Industry (TAPPI) 1 Dunwoody Park; Atlanta, Ga. 30341.

In general, coated printing papers are of two types: Those which are characterized by a high level of pigmentation or filler content in which by virtue of the particulate solids content are not subject to blocking, and low pigmentation or filler content which with low glass transition coatings are subject to blocking.

In the process of preparing a paper base for electrostatic masters, a paper substrate, preferably a precoated paper web having high wet strength, is coated with a resinous film forming composition from an aqueous medium for rendering the paper water resistant. An aqueous dispersion medium is desired not only from the standpoint of ultimate paper properties but also for environmental reasons. Usually the coating is applied to one side by a knifing or blade technique or with the aid of Mayer rods to provide a thin coating. The coating is then dried by passing the impregnated paper through a drier to remove the solvent or dispersing medium. Upon leaving the drier, the web is wound upon a reel. The apparatus is conventional.

It has been found that for best results in fabricating electrostatic papers of various kinds, the base paper should have a predetermined moisture content, generally less than about 8% and desirably about 5%. Where the applied barrier coating is formed from a film forming resin having a high glass transition temperature, dispersion in an aqueous medium is more difficult and may require other agents such as dispersing agents to be present to provide a stable system. These often have an adverse effect on the paper as a base for electrostatic masters. Higher temperatures are required to enable the formation of a film of sufficient impermeability to qualify as a barrier film. This may adversely affect the moisture content of the paper. Resinous film-forming materials having a lower glass transition temperature are desirable because it is easier to control water content of the paper base material.

To facilitate dispersion in an aqueous medium and stability thereof, it is desirable that the film-forming resin contain labile hydrogen such as provided by —COOH, —OH, and the like. Dispersion by a base is convenient, and for purposes of a coating to be applied to paper and dried, a volatile base, e.g., ammonia, ammonium hydroxide and various low molecular weight mono-, di-, and trialkylamines, is especially useful. For most purposes, ammonium hydroxide is used. Such film-forming compositions are very satisfactory for forming base papers for electrostatic masters and formulations based on such film formers can be used as such on individual sheets. The terms "aqueous dispersion" as used herein and in the appended claims will be understood to include colloidal dispersions of extremely fine particle size as are obtainable with ethylene/acrylic acid copolymers in the presence of $NH_4OH$ as well as latices of relatively larger particle size such as are obtainable with carboxylated styrene-butadiene copolymers.

However, where the coating to be applied contains a relatively low amount of inorganic pigment or filler, i.e., less than 50% by weight on the dry basis, and where the paper is in the form of a continuous web which must be coated, dried and wound upon a spool, a different problem is encountered in which it is a principal objective of this invention to solve. The web temperature on winding upon a take-up reel or spool is often sufficient to permit successive convolutions of the paper to fuse together or "block" whereby the entire roll will solidify into a useless block. The same problem can be encountered to some degree with sheets that are stacked as they leave a dryer. In the case of a paper web, the paper cannot be removed from the reel for subsequent treatment such as the application of the zinc oxide containing dielectric coating composition. While the problem can be alleviated mechanically with chill rolls and/or increased distance between the drier and the end spool, the present invention provides a much simplier chemical method for avoiding the problem. Blocking is not a problem where the coating contains a high proportion of pigment or filler, e.g., more than 50% by weight, dry basis, clay.

It has now been found that an ammonium zirconyl complex may be included in or contacted with the coating formulation to the extent of from about 1% to about 20% by weight (dry basis) of the film forming polymer content and that its presence will prevent blocking. It has also been found most surprisingly that the ammonium zirconyl complex crosslinks the film forming polymers in such a manner that it occurs instantaneously on evaporation of the aqueous vehicle, so that the coated paper emerging from the drier can be rolled or stacked immediately. A particularly surprising result is that the present treatment also provides better imaging characteristics on the finished masters compared to common crosslinking agents such as melamine-formaldehyde (See U.S. Pat. No. 3,317,631) and provides, as well, improvements in water resistance. Moreover, these coatings can be applied at very low weights/ream; for example, as low as 0.5 lbs./side/3300 sq. ft. Higher rates of application up to about 5 lbs./side/3300 sq. ft. may be used if desired.

While the particular utility for these coated papers is in the field of electrostatic masters, such coated paper has other uses, for example as release paper for pressure sensitive labels, beverage labels, etc.

BRIEF STATEMENT OF THE INVENTION

Briefly stated, therefore, the present invention is in a method of coating a paper substrate either in sheet form or in web form, useful in forming electrostatic masters. Coating is done with a paper coating composition containing an organic, synthetic, polymeric, hydrophobic, thermoplastic water resistant film-forming resin having a glass transition temperature below about 115° C. and preferably in the range of about 0°–100° C.

The amount of the coating applied is quite low by paper coating standards. Satisfactory results are obtained at dry coat weights per ream of less than about 5 lbs./side/ream (3300 square feet) to as low as 0.25 lb./side/ream. For most puposes, 0.5 lb./side/ream will be found satisfactory particularly when the paper is used as a base for electrostatic masters in which case the coating acts as a barrier coat. The resins are also characterized by having a substantial proportion of labile hydrogen-containing functional groups, e.g., carboxylic acid groups or hydroxyl groups, capable of reacting with an ammonium zirconyl complex to form a cross linked film at elevated temperatures, e.g., less than 200° C. and usually 150° C. to 165° C. Film-formation on the paper surface occurs by heat fusion of the resin, or coalescence of the latex particles under the influence of heat, or by evaporation of water.

The method comprises applying a thin coating of the film forming resin to the paper, reacting the resin in said coating with ammonium zirconyl complex, passing the paper substrate through a drier operating at a temperature above the glass transition temperature, and either winding the web on a takeup roll, or stacking the sheets one on top of the next. Sticking or fusion together of successive layers of the paper is obviated. The resin may be applied either as an aqueous dispersion, or from solution in an organic solvent, or as a latex dispersion in an aqueous medium. For ease of handling and environmental reasons, application from an aqueous colloidal dispersion is preferred.

The present invention also relates to a paper substrate coated with an ammonium zirconyl complex cross-linked organic, synthetic, polymeric, hydrophobic thermoplastic, film forming material having a glass transition temperature in the range from about 0°-100° C. and also having substantial labile hydrogen-containing groups therein. A particularly satisfactory example of a resin dispersible in water with the aid of a base is ethyleneacrylic acid copolymer, 80 weight percent ethylene: 20 weight percent acrylic acid. The copolymers and multipolymers useful herein form water insoluble films without ammonium zirconyl complex, and it should be clearly understood that the cross-linking agent is not used to achieve water insolubility as is the case with some prior art. Note for example, the patents to Grummitt et al U.S. Pat. Nos. 2,758,102 and 2,842,451; and British Pat. Nos. 1,024,882; 1,024,883 and 1,029,055 all issued to Inveresk Paper Co. The purpose of the ammonium zirconyl complex used herein is to convert a normally low Tg resin to a high Tg resin very rapidly so that paper coated therewith and dried (whereby the low Tg resin is elevated above its normal Tg) will not undergo blocking at low pigment concentrations.

The paper base material is then ready for use in making electrostatic masters by known methods such as disclosed in the art cited above. In making certain electrostatic masters, the usual procedure is to apply a zinc oxide containing resin from toluene solution on top of the barrier coating applied as herein described. These coatings are applied by conventional paper web coating or sheet coating apparatus, as are the barrier coatings hereof.

DETAILED DESCRIPTION OF THE INVENTION AND SPECIFIC EXAMPLES

As indicated above, the present invention contemplates the application of an organic, synthetic, polymeric, hydrophobic, thermoplastic water resistant film forming resin containing less than 35% by weight (dry basis) of an infusible pigment or filler, to a paper substrate, and contacting of the resin with an ammonium zirconyl complex either by reason of its being included within the coating composition or by topical application of an aqueous solution thereof to the coated paper. The paper substrate used herein is desirably precoated with a known barrier precoat composition, such as disclosed in our copending application Ser. No. 87,241, assigned to assignee of the present invention. These coating compositions contain clay, styrene-butadiene latex, soybean protein and a melamine-formaldehyde cross linking agent.

The preferred film forming resinous materials for use in accordance the present invention are normally solid, water-insoluble, thermoplastic, organic, addition copolymers or multipolymers of a nonacidic ethylenically unsaturated polymerizable monomer and an ethylenically unsaturated aliphatic carboxylic acid. The most satisfactory resinous materials contemplated for use herein are addition polymers which are normally solid at room temperature, e.g., 25° C., thermoplastic, normally insoluble in water and contain a plurality of functional groups reactive with ammonium zirconyl complex, e.g., carboxylic acid groups. The preferred materials within this group have glass transition temperatures which are generally below about 115° C., and preferably within the range from 0° to 100° C. The film forming resin may be applied as a colloidal dispersion in aqueous medium or as an aqueous latex. Suitable resinous materials for use in forming an aqueous colloidal dispersion or latex are the random copolymer products or mixtures of one or more polymerizable ethylenically unsaturated carboxylic acids such as acrylic acid, methacrylic acid, maleic acid, maleic anhydride, itaconic acid, fumeric acid, citraconic acid, and citraconic anhydride, methylhydrogen maleate, and one or more non-acid polymerizable monomers such as ethylene, propylene, butene-1, 1,3-butadiene and other aliphatic olefins, e.g., styrene, alphamethylstyrene, vinyltoluene, chlorostyrene, and other aromatic olefins. Particularly suitable, copolymers include multipolymers of ethylene and from about 10% to about 30% by weight of one or more ethylenically unsaturated acids, such as acrylic acid, methacrylic acid, etc., as above stated; copolymers of ethylene with from about 10% to about 30% by weight of one or more ethylenically unsaturated acids, and up to about 20% by weight of one or more monomers such as ethylacrylate, vinyl acetate, vinylidene chloride, etc.; terpolymers of butadiene, styrene and from about 10% to about 30% by weight of one or more ethylenically unsaturated acids such as those mentioned above.

Specific examples of film forming copolymers which may be used in accordance with the present invention are as follows:

| Latex Film Formers | Tg |
|---|---|
| Styrene-butadiene-acrylic acid, 60:30:10 | +18 |
| Carboxylated Styrene butadiene, 60:40 (10% carboxy) | +4 |
| Polyvinyl acetate Reichhold, "Synthemul" 4C-447 | +38 |
| Polyvinyl acetate (alkali sol.) Reichhold "Synthemul" 40-450 | +20 |
| Polyacrylic acid (firm) B. F. Goodrich "Hycar" 2600 × 84 | +8 |
| Polyacrylic acid (stiff) B. F. Goodrich "Hycar" 2600 × 138 | +25 |
| Polyacrylic acid (hard) B. F. Goodrich "Hycar" 2600 × 256 | +45 |
| Polyvinyl chloride-vinyl acetate B. F. Goodrich "Geon" 352 | +69 |
| Polyvinyl chloride-vinyl acetate B. F. Goodrich "Geon" 460 × 6 | +73 |
| Polyvinyl chloride-vinyl acetate B. F. Goodrich "Geon" 575 × 43 | +31 |
| Vinylidene chloride-vinyl chloride B. F. Goodrich "Geon" 652 | +15 |
| Vinylidene chloride-acrylic acid B. F. Goodrich "Geon" 660 × 1 | +7 |
| Butadiene/Styrene/Acrylonitrile B. F. Goodrich "Hycor" 1577 | +15 |

| | Ti °C.* |
|---|---|
| Polyacrylic Acid (Rohm & Haas) RA-90 | +12 |
| Polyacrylic Acid (Hard) (Rohm & Haas) HA-16 | +33 |
| Polyacrylic Acid (Firm) (Rohm & Haas) HA-12 | +17 |
| Styrene-acrylic acid (Rohm & Haas) P-57 | +7 |
| Acrylic/Vinyl Acetate (Rohm & Haas) E 1310 | +25 |

*°C. at which the Torsional Modulus of an air dried film is 300 kg./cm$^2$.

Colloidally Dispersible Film Formers

Ethylene/acrylic acid copolymers, 70:30; 80:20; 90:10

Ethylene methacrylic acid copolymers, 70:30; 80:20; 90:10

Ethylene/itaconic acid copolymers, 70:30; 82:18; 90:10

Ethylene/methylhydrogen maleate copolymers, 80:20

Ethylene/maleic acid copolymers, 80:20

Ethylene/acrylic acid/methylmethacrylate terpolymers, 75:20:5

Propylene/acrylic acid copolymers, 80:20

Styrene/acrylic acid copolymers, 75:25

Styrene/methacrylic acid copolymers, 75:25

Styrene/itaconic acid copolymers, 70:30

Styrene/maleic anhydride copolymers, 70:30

Styrene/citraconic anhydride copolymers, 70:30

Methyl methacrylate/acrylic acid, 70:30 and the like. These resins desirably contain from 10% to about 30% by weight of a carboxylic acid per 100 parts of resin dry basis, and have Tg's less than about 100° C.

Specific procedures and means for making the polymers are known to the art. The glass transition temperature (Tg) of the final copolymer should be below 115° C. and preferably below 100° C. The glass transition temperature can be controlled largely by the extent to which copolymerization is allowed to go, the lower molecular weight polymers favoring lower Tg's. Reference may be had to U.S. Pat. Nos. 3,799,901, and 3,753,965 for procedures for forming the aqueous dispersions of the resinous materials referred to above. In general, the process of forming the aqueous colloidal dispersion is carried out by digesting a noncolloidal mass of the polymer with an alkaline aqueous liquid medium as a continuous enveloping phase. The particle size of the dispersed resinous phase is extremely small, e.g., less than 0.1 micron. The noncolloidal mass usually comprises a common granular form of moldable resin materials, but can be any form of chip, bit or piece of material resulting from chopping or grinding, or molded bead, pill, pellet or other piece.

The resins may be utilized as latices produced by emulsion polymerization techniques and the extent of polymerization controlled so that the Tg is within the desired range. Carboxylated styrene-butadiene (60-40) latices of low pigment concentrations, e.g., 35% block easily as a paper coating. With 5% AZC in the aqueous medium of the emulsion, blocking is avoided entirely.

The base in the alkali aqueous medium is desirably ammonia, ammonium hydroxide, or water soluble strongly basic organic amines, such as, mono, di, and trimethylamine and the like, which are volatilizable from the aqueous medium at elevated temperature, to yield a pH below about 10.

The concentration of the alkali base in the aqueous medium is a function of the concentration of the labile hydrogen containing group in the starting polymer, and the amount of such polymer to be dispersed in the aqueous medium. Usually, the amount of alkali corresponds to at least 0.2 equivalent per acid group of the polymer and preferably from 0.5 to about 1 equivalent of alkali per equivalent of acid group in the polymer. In the case of ammonium hydroxide, the amount of ammonia charged is greater, e.g., from about 5 to 10 and sometimes in the order of 20 or more equivalents per acid group, to obtain rapid dispersion. The formation of the aqueous dispersion is carried out by simply holding together the starting polymer and the aqueous alkali medium under autogenous pressure.

Another method of preparing the aqueous dispersions of the copolymers of the present invention is disclosed in U.S. Pat. No. 3,389,109 to Harmon et al. Inasmuch as it is desired to volatilize the solubilizing material from the composition of the present invention, the alkali materials which are used are limited to ammonium, ammonium hydroxide, and the low molecular weight alkyl amines.

As indicated above, another essential material for use in accordance with the present invention is an aqueous solution of an ammonium zirconyl complex. In general, these solutions have a pH of from about 5 to about 10. Although it is a primary advantage of the present invention that the ammonium zirconyl complex may be incorporated with the aqueous alkali dispersion of the copolymer or terpolymer resin, the ammonium zirconyl complex may be contacted with the resin by subjecting the coating on the paper base material to an after- treatment by wetting it with an aqueous solution of the ammonium zirconyl complex and then heating the composite. Such after treatment may be carried out in addition to or in place of incorporating the ammonium zirconyl complex into the polymer dispersion.

A preferred ammonium zirconyl complex is the commercially available ammonium zirconyl carbonate having the formula $(NH_4)_3HZrO(CO_3)_3$. Ammonium zirconyl carbonate can be easily prepared by reacting zirconium oxychloride with a theoretical proportion of ammonium carbonate in aqueous solution containing a small amount, e.g., about 1% based on the ammonium carbonate, of ammonium hydroxide. Instead of the preferred zirconium oxychloride, zirconium sulfate may be used. (See U.S. Pat. No. 2,457,853; see also Osaka Furitsu Kogyo-Shoreikan Hokoku, 19:67–70 (1958)). Ammonium zirconyl complexes other than the preferred ammonium zirconyl carbonate may be employed herein. Examples of such complexes include the ammonium zirconyl salts of such acids as lactic acid, glycolic acid and mandelic acid. The ammonium zirconyl complex may also be formed in situ in the aqueous medium from water soluble zirconium salts, the ammonium salt of a water soluble acid, e.g., ammonium carbonate, and ammonium hydroxide.

The aqueous copolymer dispersion with or without the ammonium zirconyl complex present, may also contain pigments or fillers such as clay, calcium carbonate, barium sulfate, silica, up to about 35% by weight of the polymer material (dry basis) present in the composition. Generally, the coating compositions hereof contain from 0.5% to 35% solids, balance water and volatiles. The PVC of the system is low so that there is insufficient pigment present to afford adequate resistance to blocking. Plastic pigments, e.g., polystyrene may also be used. Generally, the amount of inorganic pigment or filler is less than 50% by weight (dry basis) of the film forming ingredient or ingredients.

When the coating composition contains ammonium zirconyl complex, or an aqueous alkali solution of ammonium zirconyl complex is topically applied to the wet coating, and the coating submitted to drying heat, the copolymer apparently immediately crosslinks to form a water insensitive barrier coating on the paper. Moreover, the coating is stabilized so that it does not undergo "blocking" when the material is rolled up or layered while hot after emerging from the dryer at a temperature near or above the glass transition temperature of the uncrosslinked resin employed. The paper so coated is useful as a base for electrostatic papers, and any of the numerous types of electrostatic paper and coating techniques for generating the same may be employed to form such paper. It has been found quite unexpectedly that the imaging characteristics of papers treated in the manner described herein is much improved over the imaging characteristics of papers prepared in a different manner. The presence of the ammonium zirconyl complex in the treating compositions shows a substantial improvement over the same resin base coated paper in respect of the imaging characteristics.

The invention will be illustrated by the following specific examples being understood that these are for illustrative purposes only and not intended to limit the scope of the invention.

EXAMPLE I

A 63 lb./3300 sq. ft. paper sheet was given a blade precoat of 10 lb./side/3300 sq. ft. with a coating consisting of:

100 parts clay
7.5 parts Dow 722 plastic pigment (polystyrene, ½ micron)
18.0 parts of Dow 620 styrene-butadiene latex
5.0 parts of soybean protein The precoated sheet was then given a final blade coating of 0.5 lb./side/3300 sq. ft. of the following composition:

100 parts Dow XD 30508 ethylene/acrylic acid (80:20)
25 parts Dow 722 plastic particles (polystyrene, ½ micron)

It was found that the roll of paper thus produced could not be unwound due to blocking. A second run was made but 5 parts of ammonium zirconyl carbonate was added as an aqueous solution to the above final blade coating composition. No blocking was observed. The improvement in antiblocking was so dramatic that the paper could be supercalendered after drying between hot chrome and cotton rolls without sticking to the rolls or blocking.

EXAMPLE II

Additional benefits found were improved imaging and background on the final ZnO coated master and improved water resistance as measured by the Cobb Test. The previously described precoated sheets were given a blade coating on both sides of 0.5 lb./side/3300 sq. ft. of Coating A* with the modifiers as stated below in Table I. The Cobb Tests were measured and an obvious improvement was noted as shown in Table I. The sheets were then ZnO coated on one side with a conventional toluene dispersion of ZnO and a resin binder at a coat weight of 20 lb./3300 sq. ft. Cobb Tests were again measured and an improvement was noted when using ammonium zirconyl carbonate (AZC).

TABLE I

| Coating A and Curing Agent | 2½ Minute Cobb Test on Master Base Paper (gm/m²) | 10 Minute Cobb Test on ZnO Coated Master (gm/m²) | Master Imaging: Background | Master Imaging: Image Mottle |
|---|---|---|---|---|
| 5% MF | 20.5 | 63.0 | Very bad | Poor |
| 5% AZC | 15.8 | 3.0 | Good | Good |
| 10% AZC | 7.3 | 5.3 | Good | Good |

% AZC and MF (Berset 8635) based on ethylene/acrylic acid, 80:20
*Coating A:
100 parts ethylene/acrylic acid, (80:20)
50 parts Dow 722 plastic pigment (polystyrene, ½ micron)
5 parts VTL 500 (sulfonated polystyrene)
*Trademark of National Starch Co.
MF: Melamine-formaldehyde The sulfonated polystyrene (VTL 500) is a conductive agent employed in the barrier coat in accordance with the principles set forth in commonly owned copending application Ser. No. 186,756 filed Sept. 12, 1980 and entitled Conductive Films Containing Plastic Particles and a Conductive Agent, the disclosure of which is incorporated herein by reference thereto.

The masters thus prepared were conditioned overnight at 50% relative humidity and imaged on the A. B. Dick 675 mastermaker. The masters were evaluated with respect to background and image mottle. A significant improvement in both of these undesirable characteristics was noted when AZC was used.

The Cobb Test referred to above consists in placing the finished paper in contact with water for 2½ minutes, discarding the water, gently blotting excess water off the paper, and then determining the weight of water absorbed. This procedure correlates with the amount of water actually absorbed on a printing press. "Water resistance" as used herein will be understood to be a Cobb Test in 2½ minutes of less than 17.5 grams of water/square meter of paper.

The following table illustrates the effect of the ratio of film former:pigment on water sensitivity as measured by the 2.5 minute Cobb test. In this test, the coating was applied in a single pass to the wire side of a precoated base paper at various ratios of resin to pigment. The resinous film former was ethylene/acrylic acid 80:20 (EAA). The hardener, ammonium zirconyl carbonate, was not included in the coating composition. The paper was single pass blade coated to provide a dry coating weight of about 0.5 to 0.6 pounds per side per 3300 sq. feet. The Cobb test was run as described above and the results are given as grams of water per square meter of paper. The pigment was a #2 coating clay, HT Clay.

TABLE II

| Sample | Ratio Resin/Pigment Dry Basis | Actual Wire Side Coat Wt.* | 2½ Minute Cobb Test. Gms. $H_2O/m^2$ | Blocking Tendency |
|---|---|---|---|---|
| 1 | 0.03/1 | 0.57 | 24.0 | No Blocking |
| 2 | 0.3/1 | 0.55 | 24.0 | No Blocking |
| 3 | 1/1 | 0.52 | 24.4 | No Blocking |
| 4 | 2/1 | 0.53 | 22.1 | Slight Blocking |
| 5 | 5/1 | 0.52 | 14.5 | Severe Blocking |
| 6 | Straight EAA | 0.52 | 3.3 | Severe Blocking |
| 7 | Blank Base Paper | | 24.1 | — |

*Avg. of 3 tests.

It will be noted from the above Table I that at the very low resin/pigment ratios, the Cobb test is very poor. At about 33% pigment (or filler) improvement in the Cobb test is initiated up to the point where no pigment is present where the lowest water pick-up is observed. Thus, the lower the amount of inorganic pigment the more water resistant the paper. However, the clay does confer desired properties at the sacrifice of water resistance, and, depending upon the ultimate use of the paper, the quantity of pigment is determined. Experience has shown that the papers with the very high pigment loading, for example, samples 1, 2, and 3, do not experience "blocking." The samples 4, 5 and 6 show increasing susceptibility to "blocking" in the absence of treatment with an ammonium zirconyl complex. In the blocking tests, coatings were applied with a blade on a precoated base at a coat weight of 3 lbs./side/3300 sq. ft. The blocking test was done by applying a pressure of 1.2 psi at 150° C. for 60 seconds. Note that at least 50% clay based on the resin is required to prevent blocking. The resin used in Table II was ethylene/acrylic acid copolymer 80:20 (Dow XD 30508).

In the foregoing discussion, particular emphasis has been placed on the alkylene/carboxylic acid copolymers, e.g., ethylene/acrylic acid copolymer, wherein the polymer contains carboxyl groups. It will be understood that the invention is applicable to film forming compositions containing functional groups either in addition to or in lieu of carboxyl groups so long as there are present in the copolymer or multipolymer structure functional groups which are reactive with an ammonium zirconyl complex, particularly, ammonium zirconyl carbonate.

What is claimed is:

1. A method for the preparation of a paper base suitable for electrostatic masters for lithographic printing comprising the steps of (a) applying to at least one side of a paper substrate a thin coating of a barrier coating composition which comprises
   (1) an aqueous medium,
   (2) a film-forming amount of a synthetic, organic, polymeric, thermoplastic, water-resistant, film-forming resin which is solid at ordinary temperatures, and which has a glass transition temperature less than 115° C., said film forming resin also having labile hydrogen-containing groups reactive with an ammonium zirconyl complex,
   (3) less than 35% by weight (dry basis) of inorganic particulate material,
   (4) the ratio of resin to inorganic particulate material being at least 2:1;
(b) cross-linking the resin in said coating with an ammonium zirconyl complex;
(c) passing said paper through a dryer operating at a temperature such that the temperature of said paper substrate and coating is elevated above said resin glass transition temperature; and
(d) positioning said coated paper following drying in successive layers;
(e) said coating composition being rendered non-blocking by cross-linking with the ammonium zirconyl complex whereby fusion of the successive layers is obviated.

2. A method as defined in claim 1 wherein the coating composition is an aqueous colloidal dispersion of said resin.

3. A method as defined in claim 1 wherein the paper is in the form of a paper web.

4. A method as defined in claim 1 wherein the paper is in sheet form.

5. A method as defined in claim 1 wherein said aqueous dispersion further includes from 10% to 30% by weight of the resin of a filler.

6. A method as defined in claim 1 wherein said labile hydrogen groups are carboxyl.

7. A method as defined in claim 1 wherein the labile hydrogen groups are carboxyl and the carboxyl containing moiety of the copolymer amounts to from 10% to 30% of the copolymer.

8. A method as defined in claim 1 wherein the resin is an alkylene/unsaturated carboxylic acid copolymer.

9. A method as defined in claim 8 wherein the alkylene/unsaturated carboxylic acid copolymer is an ethylene/acrylic acid copolymer.

10. A method as defined in claim 9 wherein the ethylene moiety of the copolymer is from 80% to 90% by weight and the balance is acrylic acid.

11. A method as defined in claim 1 wherein the ammonium zirconyl complex is ammonium zirconyl carbonate.

12. A method as defined in claim 1 wherein the ammonium zirconyl complex is dissolved in the coating composition.

13. A method as defined in claim 1 wherein an ammoniacal aqueous solution of an ammonium zirconyl complex is topically applied to the coated paper prior to drying.

14. A method as defined in claim 1 wherein the ambient temperature in the drier is from 150° to 160° C.

15. The method of claim 4 wherein the ratio of resin to inorganic particulate material is at least 5:1.

16. A paper base prepared according to the method of claim 1.

* * * * *